Oct. 14, 1952 L. NEMENYI-KATZ 2,613,529
DEVICE FOR TIMING AND ADJUSTING BALANCE WHEEL ASSEMBLIES
Filed Nov. 30, 1949 2 SHEETS—SHEET 1
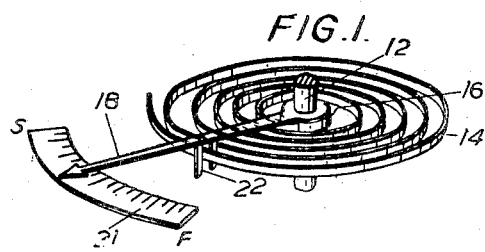
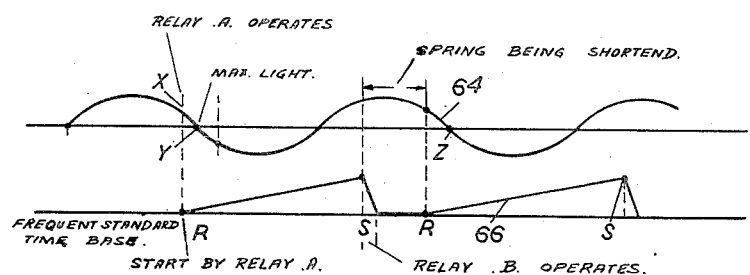
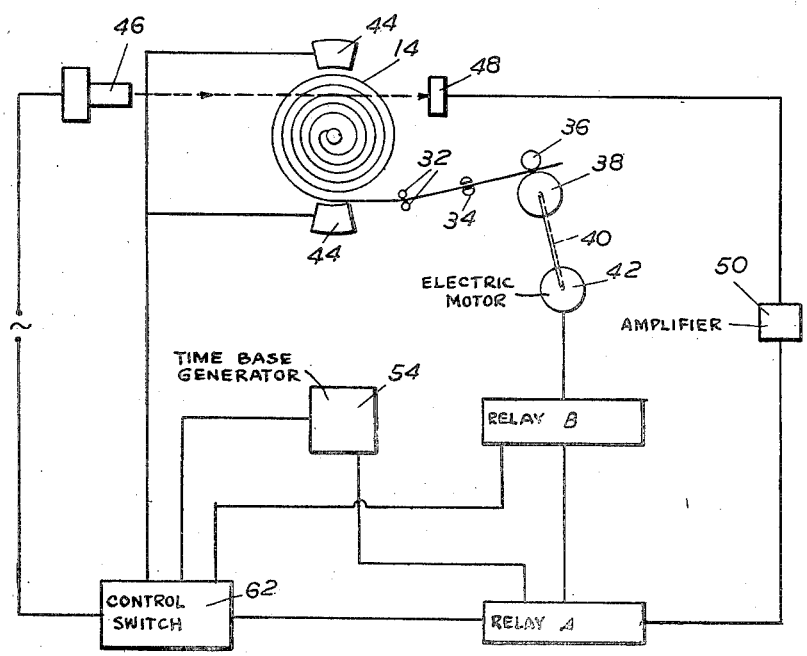

Patented Oct. 14, 1952

2,613,529

UNITED STATES PATENT OFFICE 2,613,529

DEVICE FOR TIMING AND ADJUSTING BALANCE WHEEL ASSEMBLIES

Laszlo Nemenyi-Katz, London, England

Application November 30, 1949, Serial No. 130,108
In Great Britain November 30, 1948

1 Claim. (Cl. 73—6)

This invention relates in general to an apparatus for the timing of clocks and watches and the like and more particularly to apparatus for the timing and adjustment of balance wheel and hairspring assemblies of clocks and watches.

In the manufacture of clocks and watches each balance wheel with its associated hairspring undergoes a preliminary timing adjustment before installation in the clock or watch of which it is to form part in order to insure that the frequency of oscillation is within the limits of regulation provided in the completed movement. The correct rate of oscillation is commonly secured during such preliminary timing adjustment by gradually decreasing the length of the hairspring until the wheel oscillates at the desired predetermined frequency for the movement concerned.

Known apparatus for expediting this preliminary timing operation may be classified into two main types in accordance with the basic principles employed.

In one main type of known apparatus the operation of timing is based on the principle that in an oscillatory system the amplitude of oscillations builds up to large magnitudes as the resonant frequency of the system is brought into coincidence or synchronism with the frequency of an applied oscillatory driving force. In this type of known apparatus the wheel under test is constrained to execute forced oscillations under the influence of and at the same frequency as a driving force of standard predetermined frequency while the hairspring length is being adjusted to the point at which the amplitude of oscillations of the wheel attains to a maximum value.

In contradistinction to this first type of known apparatus characterized by the employment of a forced oscillation at the fixed frequency of a standard driving force the characteristic of the second main type of known apparatus is that the wheel is allowed to execute free oscillations the frequency of which is compared with a standard predetermined frequency while the hairspring undergoes adjustment to the point at which the free oscillations executed by the wheel become equal in frequency to that of the said standard frequency.

The present invention relates to an apparatus of this second type, namely that in which the wheel executes free oscillations the frequency of which is compared with that of a standard predetermined source.

According to the present invention the balance wheel under test is automatically maintained in a state of continuous or sustained self-oscillation throughout the adjustment process. This situation is exactly analogous to the case of an electrical self-oscillator in which the frequency of oscillations, as governed by the constants of the system, is varied by adjustment of one of the said constants. By means known in the art adapted to respond to the movements of the balance wheel sharp electrical impulses are generated having a frequency equal to the frequency of self-oscillation of the wheel. These sharp impulses, hereinafter referred to as "wheel-pulses," are applied according to the invention to control the operation of an electrical time-base generator of standard predetermined period in such manner that a time-base is initiated at the instant of arrival of each wheel pulse, the said time-base terminating after the lapse of the said standard period. At the instant of termination of each time-base period a sharp impulse is emitted by the time-base generator. This latter sharp impulse emitted by the time-base generator at the termination of each standard time-base interval is hereinafter referred to as a "standard pulse."

It will be appreciated from the foregoing explanation that when the self-oscillatory period of a wheel is longer (slow) than the standard time-base, a standard-pulse will be emitted before the generation of the succeeding wheel-pulse initiating the next standard time-base. Consequently there will be an interval of time between the standard pulse and the succeeding wheel-pulse and this interval constitutes, at any moment during the timing process, a measure of the discrepancy between the period of self-oscillation of the wheel and the standard predetermined period of the wheel controlled time-base generator, which standard period the wheel should eventually reach. It will be evident also that when the wheel reaches the condition of correct timing the wheel-pulses will be coincident exactly with the standard-pulses.

According to the invention the said standard-pulses and wheel-pulses are employed to control the starting and stopping, respectively, of an electric motor suitably coupled mechanically to the hairspring with the object of accomplishing the requisite progressive shortening of the hairspring.

From the manner in which the standard-pulses and wheel-pulses are derived it will be understood that the time interval for which the said shortening motor is operative is governed by the duration of the discrepancy interval between the standard-pulses and the wheel-pulses. Let us assume for example that the balance wheel has to be adjusted to oscillate with a required natural period of 500 milliseconds. The said period of 500 milliseconds will therefore be the predetermined standard period of the time-base generator. Now suppose that during some point of the timing adjustment the wheel is self-oscillating with a period of 520 milliseconds. Under these assumed conditions the standard time-base, initiated by a wheel-pulse, will terminate 500 milliseconds after initiation and at the instant of termination a standard-pulse will be emitted. The said standard-pulse will be emitted 20 milliseconds before the advent of the next wheel-pulse. There will thus be a discrepancy interval of 20 milliseconds, during which the hairspring shortening motor will be operative. As a consequence of this shortening the succeeding oscillation will tend to have a period of shorter duration and since the shortening motor is under the control of the discrepancy interval the conditions established are such as will lead to a progressive diminution of the discrepancy interval. These conditions are therefore such that the system is varied automatically towards the point of correct timing of the wheel.

In practice the hairsprings are always made too long, for obvious reasons, and the degree of shortening required may amount to a considerable portion of the unadjusted spring. As a consequence much time may be consumed in a timing apparatus in bringing the spring to within close range of the correct length and this represents a large addition to the manufacturing costs. In the case of the present invention it will be clear from the foregoing description of the principle under which the shortening motor operates that the spring will be rapidly brought to within close range of the correct length since the amount of shortening in each period is governed by the duration of the discrepancy interval thereby giving vastly improved type of operation.

To enable the invention to be more fully understood, it will now be described with reference to the accompanying drawings in which:

Fig. 1 shows a balance-wheel and hair-spring assembly together with the fine adjustment device in known clock and like mechanisms;

Fig. 2 shows graphically the oscillation of a balance wheel and hair-spring assembly and those of a constant time base;

Fig. 4 shows diagrammatically an apparatus for adjusting assemblies according to the invention.

Figure 5:
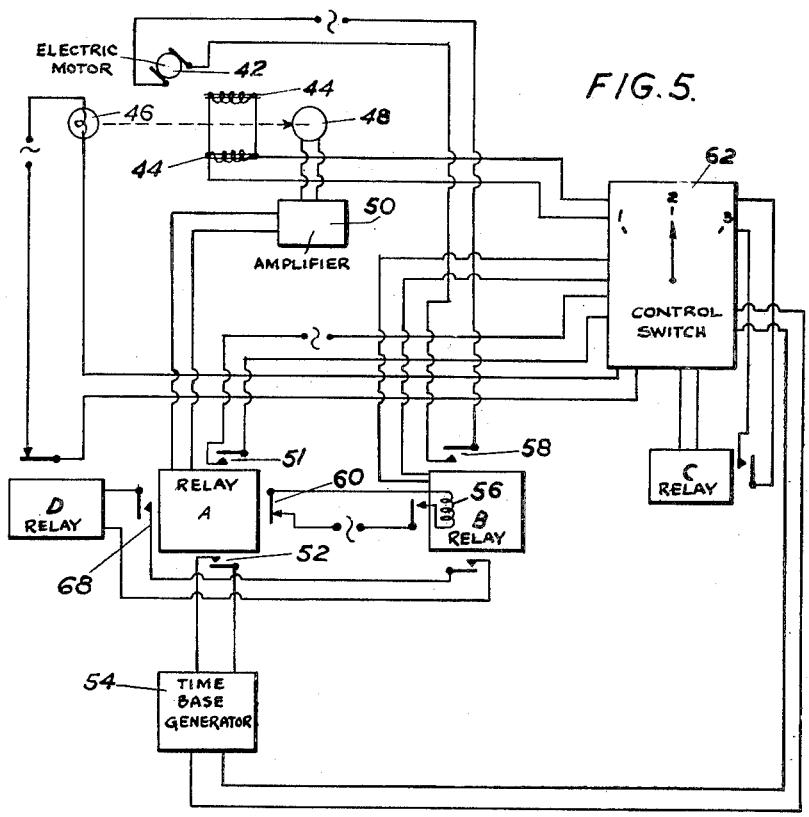
Fig. 5 shows a wiring diagram for the apparatus shown in Fig. 4.

Referring to Fig. 1 a clock or like escapement mechanism includes a balance wheel 10 (not shown in Fig. 1—see Fig. 3) secured to a shaft 12 and a hair-spring 14; the latter is secured to the staff by a collet 16 and its free end is fixed to the frame of the mechanism on which the escapement is mounted. The free end of the spring 14 is usually passed through a slot or the like on the frame and is secured by a wedge or the like. When the balance wheel and hairspring assembly is calibrated with a constant time base, the spring is usually marked as by a scratch or kink for example, so that when mounted in the frame the mark is brought into register with the edge of the slot or the like and thus the assembly is mounted with the desired length of hair-spring.

An arm 18 is pivotally mounted by a pin on the mechanism frame (not shown) and is arranged so that it may be moved by hand, but is sufficiently tight not to move of its own accord. A scale 21 is provided on the frame so that the arm 18 when rotated about its pivot, slides over the scale which is marked, as by F and S, to indicate Fast and Slow respectively.

The arm is provided with a forked extension 22 which embraces the spring 14 near the slot or the like. If the arm 18 is moved to the Fast side of the scale 21 the extension 22 will engage the spring 14 further from the slot; if moved to the Slow side it will engage the spring nearer the slot; thus the wheel will oscillate faster or slower owing to the effective shortening or lengthening of the spring 14. By this means a timed watch can be varied by up to 5 minutes either fast or slow per day. If a greater variation is required the spring must be lengthened or shortened at the slot and therefore when calibrating the spring 14 with its balance wheel 10 during manufacture of the watch, its length must be determined so that when inserted in the clock or like mechanism, with the forked extension in the centre of the scale 21, the balance wheel and hair-spring assembly will be adjusted to this degree of accuracy.

Figure 3:
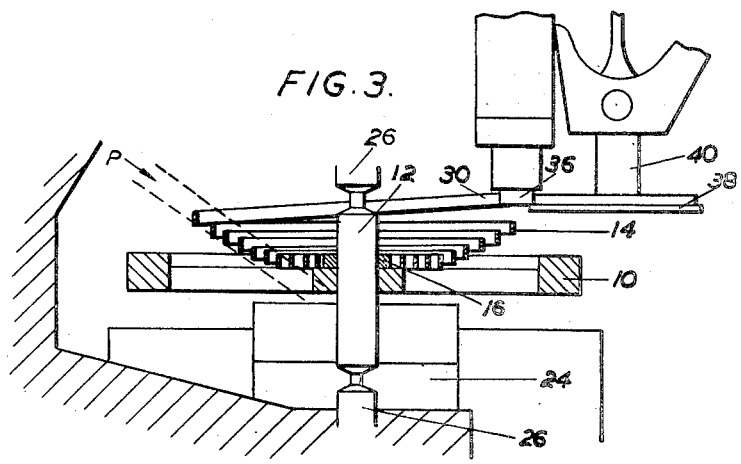
Fig. 3 shows a balance wheel and hair-spring assembly mounted in a jig for adjustment according to the invention.

For this purpose according to the invention the balance wheel and hair-spring assembly is mounted in a jig—see Fig. 3—which is arranged to simulate the conditions within the mechanism for which the assembly is designed, including mounting the arbor or staff between jewel bearings as used in clock and like mechanisms.

The jig is provided with two bearing blocks 24 having bearings 26 such as jewel bearings in which the balance wheel 10 is pivotally mounted on its staff 12. The blocks 24 are arranged in a known manner so that they may be loosened to allow the staff to be placed between the bearings and then secured to form rigid bearings in which the staff may rotate freely.

One end of the spring 14 is anchored to the staff 12 by the collet 16 or the like in the known manner and the other end 30 is passed successively through breathing or curb pins 32 (Fig. 4) a split block 34 simulating the clamping means on the clock or like frame, and finally between rollers 36, 38 to be described.

The breathing or curb pins 32 act to steady the spring and are constructed to form the equivalent to the like device in a clock or like mechanism (Fig. 1). The block 34 is split to provide a slot of sufficient size that the end of the spring 14 passes freely through it without allowing any play. Thus the effective length of the spring, when the assembly is in the jig, is from the collect 16 to the point of entry into the block 34.

As will be explained later the spring 14 is arranged in the jig with its free end 30 held higher than the collet 16. This differs from the mounting of the assembly in the clock or like mechanism where the coils of the spring lie in the same horizontal plane. Thus in the jig the bearing or curb pins 32 are arranged nearer than in the clock or like mechanism to compensate for this difference.

The roller 36 is an idler roller and is frictionally engaged by the roller 38 which is secured to a shaft 40 mounted in the jig and connected preferably directly to a low-geared electric motor 42. The shaft 40 is either pivoted or of such resilience that the free end of the spring 14 may be passed between the two rollers and frictionally engaged between them, so that on rotation of the motor the spring 14 is drawn between the rollers to shorten it and thus cause the oscillating balance wheel to oscillate faster.

Referring to Fig. 4, two shaded pole electro-magnets 44, fed by an alternating current of a suitable frequency, are arranged in the jig to provide, in the proximity of the wheel 10, a rotating magnetic field which, by repeated electric impulses, cause an oscillation of the wheel 10 at its own natural beat.

The free end 30 of the spring 14 is arranged in the block 34 to be higher than at its collect 16, so that as the wheel oscillates and the spring winds up or unwinds, it will present a varying depth in side elevation.

A projector 46 of any suitable known construction is provided and arranged in the jig to project a light beam across the spring. Opposite the projector 46, a photo-electric cell 48, of any suitable known construction, is arranged so that the light beam from the projector will cast the shadow of the spring 14 thereon.

As will be seen from Fig. 4 the light beam is projected across a chord of the spring and is so positioned that when the spring is unwound it will lie across the light beam and when wound up it will be clear of the beam. The actual amount of beam covered and uncovered by the oscillating spring is immaterial; it is the variation in the light falling on the photo-electric cell which is important and the cell and associated members of the apparatus will be adjusted to ensure that the light variation on the cell is recorded and compared with the constant time base.

In Fig. 3 the light beam is shown as being in the direction of the arrow P so that its path lies along the lower edges of the spring coils. As the spring unwinds and winds up the coils will lie respectively more or less on the beam. The directions of the beam shown in Figs. 3 and 4 may be combined if desired.

The cell 48 is connected electrically to an amplifier 50 of suitable known construction. The output of the amplifier is connected to an electro-magnetic relay A (Fig. 5) which is fitted with a number of contact pairs to be described. When the relay A is energised it will close, among other electric circuits as described later, the first contact pair 51 being the supply circuits of the shaded pole electro-magnets 44. If the balance wheel 10 is caused to swing clockwise and reverse, the hair-spring 14 will, in one direction wind up close and the opposite direction will unwind and cause a variation in the quantity of light reaching the photo-electric cell 48. The lower and upper peak of this variation will exactly coincide in each swing with one or other of the directions of movement of the balance wheel. The amplifier 50 coupled to the photo-electric cell 48, is so adjusted that it will deliver an electric impulse to the relay A either when the maximum or, as it may be more convenient, when the minimum quantity of light will reach the photo-electric cell. This impulse is so delayed that it should close the circuit of the rotating field generating electro-magnetic system to the electric magnets 44, when the balance wheel 10 has already turned almost half of its swing in one direction; it will be seen from the above description, that if the balance wheel has been caused to start oscillating, the means described above will maintain it in oscillation at a time beat governed by the length of the hair-spring in operation.

The above relay, A as described, is fitted with further pairs of contacts. The second pair of contacts 52 is connected in the circuit of a time-base generator 54. The time-base generator 54 may be a chain of multi-vibrators designed to start operating instantaneously when its circuit at a standby point is closed. The origin of the required constant time beat may be a high frequency crystal oscillator or frequency standard (not shown) connected to a series of multi-vibrators. The filament of every valve is connected to the main supply in order to maintain the heating of the cathodes. Along the chain of the multi-vibrator stages one of the grid supply (in a position where the possible time error is negligible) is partially suppressed or interrupted through a circuit governed by the second pair of contacts 52 fitted on relay A. The operation of the time-base generator is such, therefore, that it may be started at any time when the photo-electric cell controlled relay A operates at the peak of the swing of the self-oscillating balance wheel.

The output of the time-base generator 54 is connected to a relay B. The relay B is constructed so that its operating period is the same as that of the relay A and the relay B is fitted with a holding coil 56, which holding coil when energised will maintain the circuit established by the contact pairs of the relay B.

The holding coil 56 of the relay B receives its main supply through the third contact pair 60 of the relay A which is a circuit breaking contact pair, meaning that it will break the circuit of the holding coil 56 of the relay B every time the relay A operates. A three position control switch 62 is provided; the wiring diagram (Fig. 5) indicates how the above described components are connected together.

In its first position the switch 62 disconnects the light source, in order to prevent the photo-cell operating relay A and thus enable the jig to be loaded.

In the second position the switch 62 connects the time-base generator to a relay C instead of to the relay B and connects the relay C to the rotating field operating coils and finally connects the time beat source into the operating circuit.

In the third position, the switch 62 will cancel the condition of various circuits established in the second position, and re-establish the circuits as in its first position and will also connect up the lamp in the projector.

One contact pair 58 of the relay B is capable of closing the circuit of the electric motor 42, which as above described, is capable of turning the rollers 36, 38. Preferably, the hair-spring subject to timing, is always too long and it is to be shortened to obtain a correct time beat. Therefore, the time space between two beats of the self-oscillating balance wheel is longer than one identical impulse received from the constant time beat source.

Referring to Fig. 2, in the graph shown, the ordinates represents the amount of light received by the cell from the light source when traversing the oscillating spring and the impulse of the time-base generator; the abscissae represent the time values of the oscillations of spring and constant time base. The curve 64 is that of a hair-spring and is in fact a sine curve. The curve 66 is that of the time-base generator or a saw-toothed generator.

At the point X in the curve 64 the spring is approaching the centre of its oscillation represented by the point Y; the next double oscillation or cycle of spring oscillation is completed at the point Z. The curve 66 starts at point R corresponding to point X on curve 64 and represents a voltage which rises linearly to a maximum value at the point S. The point X represents the moment in the oscillation of the spring 14 when sufficient light is available at the cell 48 to start the time base so that the time base is fully operational at the point Y. The standard time value is represented on the abscissae by the length, S—S minus S—R. This distance is initially less than Y—Z since the spring 14 is originally overlength. Between the point S and the next point R on curve 66 the motor 42 is operated to reduce the effective length of the spring 14 and thus the length Y—Z.

The operation of the above described apparatus will now be given, from which it will be seen that the above adjustment of the length of the spring 14 is achieved automatically and rapidly.

To load the jig the switch 62 will be turned to the first position. When the jig is fully loaded and the hair-spring 14 is located between the rollers 36, 38, the switch 62 will be turned to the second position. The time-base generator will start, and through the relay C it will deliver impulses to the rotating field generating electromagnets 44. After a few impulses, the balance wheel 10 will begin to swing and when its oscillation is sufficiently great to achieve a marked variation of the height of the hair-spring in the path of the light beam, the adjusting operation is started by moving the switch 62 to its third position.

In the third position the switch 62, as it is described previously, will switch on the lamp in the projector so that the photo-electric cell may register the first peak of the oscillating movement of the balance wheel hair-spring assembly. The relay A will operate and will maintain closed the circuit of the self-oscillating drive, i. e. the electro-magnets 44, and the grid circuit of the time-base generator, and at the same time will open the coil circuit of the relay B.

The time-base generator will operate and its first impulse will be a certain time lag earlier than the second impulse of the relay A (see Fig. 2).

The relay B will therefore operate and will remain closed until the circuit of the holding coil 56 is broken by the relay A. The relay B will close the circuit of the electric motor 42 which will start to remove a length of hair-spring from the coil of the spring until the relay A receives its second impulse breaking the circuit of the holding coil 56 of the relay B.

The operation of the relay A and the relay B will be repeated automatically until both relays operate synchronously.

A further pair of contacts 68 may be added to the relay A and the relay B which may be connected in series with a further relay, relay D circuit, so that when the two relays A and B operate synchronously i. e. in identical time, the relay D will be energized to cut off the light source and the apparatus, and also signalling by any suitable means that the objects of timing have been achieved.

It will be understood that any suitable prime mover may be used in place of the electric motor 42 providing it can be operated in the above described manner within the desired limits of time and rotation of the shaft 40.

While the electromagnets 44 are quite suitable and satisfactory in operation, any other known suitable means such as magnets operated by 3-phase supply may be provided for oscillating the balance wheel and hair-spring assembly.

Further the light source is shown as the projector 46, but any other known suitable source of light may be employed.

The invention has been described with reference to balance wheel and hair-spring assemblies for use in clock, watch and like mechanisms but it may also be used for adjusting such assemblies for use in other devices such as stroboscopic devices. In the last named devices the assembly may be used not as a constantly oscillating mechanism, but as a floating mechanism which, when subjected to the forces or characteristics to be measured, will record these forces as a measurement of the spring displacement, on a dial or the like over which moves a pointer or arm connected to the arbor or staff of the balance wheel.

In this case, it is still the length of the spring which is important and must be adjusted initially to the correct length. In such a construction the constant time beat source is replaced by a calibrated standard of spring displacement.

I claim:

An apparatus for automatically adjusting a balance wheel and hair-spring assembly adapted for use in time-pieces and the like, in which the assembly is mounted in a manner simulating the conditions within the mechanism wherein the assembly is to be used, comprising: electrical means for maintaining the balance wheel in a state of continuous self-oscillation throughout the adjustment; means under the control of the balance wheel for producing electrical wheel pulses of a frequency corresponding to that of the self-oscillations of the balance wheel; an electrical time-base generator producing standard pulses at predetermined intervals of time; means under the control of the said electrical wheel pulses adapted to initiate the starting of each time-base operation of the said generator; an electric motor adapted to rotate only when there is a time discrepancy between the wheel pulses and the standard pulses of the balance wheel and time-base generator respectively and to stop when the said discrepancy is reduced to zero; and means between the electric motor and the hairspring capable of effecting a shortening movement of the hairspring under the control of the electric motor the latter means comprising a roller secured to the motor shaft and another roller, between which two rollers lies the outer end of the hair spring in frictional contact therewith, whereby the shortening of the hair spring is effected gradually by the electric motor as the discrepancy interval between the wheel pulses and the standard pulses is reduced and the further shortening of the hairspring stops when the said discrepancy interval has been reduced to zero and the electric motor stops.

LASZLO NEMENYI-KATZ.

REFERENCES CITED

The following references are of record in the file of this patent:

UNITED STATES PATENTS

| Number | Name | Date |
|---|---|---|
| 2,094,057 | Brown | Sept. 28, 1937 |
| 2,227,858 | Knobel | Jan. 7, 1941 |
| 2,330,416 | Gibbs | Sept. 28, 1943 |